United States Patent [19]
Marrash

[11] Patent Number: 5,447,089
[45] Date of Patent: Sep. 5, 1995

[54] ELECTRONIC METRONOME WITH VARIABLE TEMPO CONTROL

[76] Inventor: James G. Marrash, 161 Prospect Park West, Brooklyn, N.Y. 11215

[21] Appl. No.: 52,624
[22] Filed: Apr. 27, 1993
[51] Int. Cl.⁶ .............................................. G09B 15/00
[52] U.S. Cl. ..................................................... 84/484
[58] Field of Search ................. 84/484, 470 R, 454, 84/455, 456, 457; D10/43

[56] References Cited

U.S. PATENT DOCUMENTS

| | | | |
|---|---|---|---|
| 2,150,967 | 3/1939 | Franz | 84/484 |
| 2,715,841 | 8/1955 | Franz | 84/484 |
| 2,817,208 | 12/1957 | Franz | 84/484 |
| 3,230,785 | 1/1966 | Franz | 84/484 |
| 3,284,650 | 11/1966 | Franz | 84/484 |
| 3,467,959 | 9/1969 | Zazofsky | 84/484 |
| 3,541,916 | 11/1970 | Reid | 84/484 |
| 3,664,225 | 5/1972 | Robertson | 84/484 |
| 3,771,407 | 11/1973 | Leonard | 84/484 |
| 4,141,273 | 2/1979 | Austin | 84/484 |
| 4,204,400 | 5/1980 | Morohoshi | 84/484 |
| 4,462,297 | 7/1984 | Dill et al. | 84/484 |
| 4,583,443 | 4/1986 | Senghaas | 84/484 |
| 4,602,551 | 7/1986 | Firmani | 84/484 |
| 4,733,593 | 3/1988 | Rothbart | 84/484 |

OTHER PUBLICATIONS

Nady Song Starter, 1991–92.
Boss Dr. Beat DB-33, 1991–92.
Exacto Quartz Metronome, Credit Card Metronome, 1991–92.
Pacemaker Mini Metronome, Metrina Multi 353, 1991–92.

*Primary Examiner*—Michael L. Gellner
*Assistant Examiner*—Cassandra C. Spyrou
*Attorney, Agent, or Firm*—Ostrager, Chong & Flaherty

[57] ABSTRACT

An electronically programmable metronome has a footswitch for allowing a user to adjust the tempo over a continuous range without taking hands off an instrument or interrupting playing. A microcontroller is preprogrammed with a metronome click pattern in any selected note duration value. The user operates a footswitch to increase the tempo automatically in continuous increments and to hold a desired tempo. A digital pulse voltage source and acoustic pulse switch are responsive to control logic to produce different amplitudes and tones for three types of clicks, i.e., Loud, Medium, and Soft, in order to provide distinctly different audible click patterns. Headphones, an audio speaker, and/or an LED indicator can be used to provide audible and visual cues of the tempo to the user. The metronome unit includes a display for menu selection, prompts, and visual cues for adjustment of the tempo and selection of types of clicks in a beat pattern. The microcontroller for the metronome unit can be programmed with any combination of time signatures, rhythms, or patterns with desired cues or accents.

10 Claims, 2 Drawing Sheets

ELECTRONIC METRONOME WITH VARIABLE TEMPO CONTROL

FIELD OF THE INVENTION

This invention generally relates to electronic metronome equipment for setting a desired tempo, and particularly to a metronome having a non-manual electronic setting device for varying a tempo in continuous increments for any standard note value.

BACKGROUND ART

Metronomes are commonly used to set an audible tempo to assist a musician practicing or composer composing music. Such conventional equipment typically has a mechanical or electromechanical dial or range setting which allows a variable tempo to be set from 40 to 208 clicks per minute. The tempo may be increased in increments of 2, 3, or 4 clicks (smallest time interval) in a basic ¼ note timing. Some units add 2/4, 3/4, 5/4, and 6/4 rhythms by providing a selected number of clicks in a beat interval with the first click "accented". Besides having a discontinuous tempo adjustment and limited rhythm patterns, the conventional equipment also has the problem that the user must manually set the tempo adjustment by taking hands off an instrument or otherwise interrupting playing.

SUMMARY OF THE INVENTION

The present invention provides an electronically programmable metronome which allows a user to adjust a tempo over a continuous range of increments and to increase the amount of any increment from as low as one increment unit, without taking hands off an instrument or interrupting playing. A microcontroller is preprogrammed with metronome click patterns for a plurality of divisions of standard note values, and a note division value is selected by the user via select switches. The user can operate a footswitch unit to increase the tempo automatically in continuous increments and, in a program mode, to hold a desired tempo while incrementing. A digital pulse voltage source and acoustic pulse switch are responsive to control logic to produce different amplitudes and tones for three types of clicks, i.e., loud, medium, and soft, in order to provide distinctly different audible click patterns. Headphones and/or an audio output allows the user to hear the adjustment of the tempo.

The metronome unit includes a display which can show a menu for user selection, prompts, and visual cues for adjustment of the tempo and the position of clicks in a given beat pattern. The microcontroller for the metronome unit can be programmed with any combination of time signatures, rhythms, or patterns with the desired cues or accents.

Other objects, features and advantages of the present invention are described in further detail below in conjunction with the drawings.

DETAILED DESCRIPTION OF THE INVENTION

Figure 1:
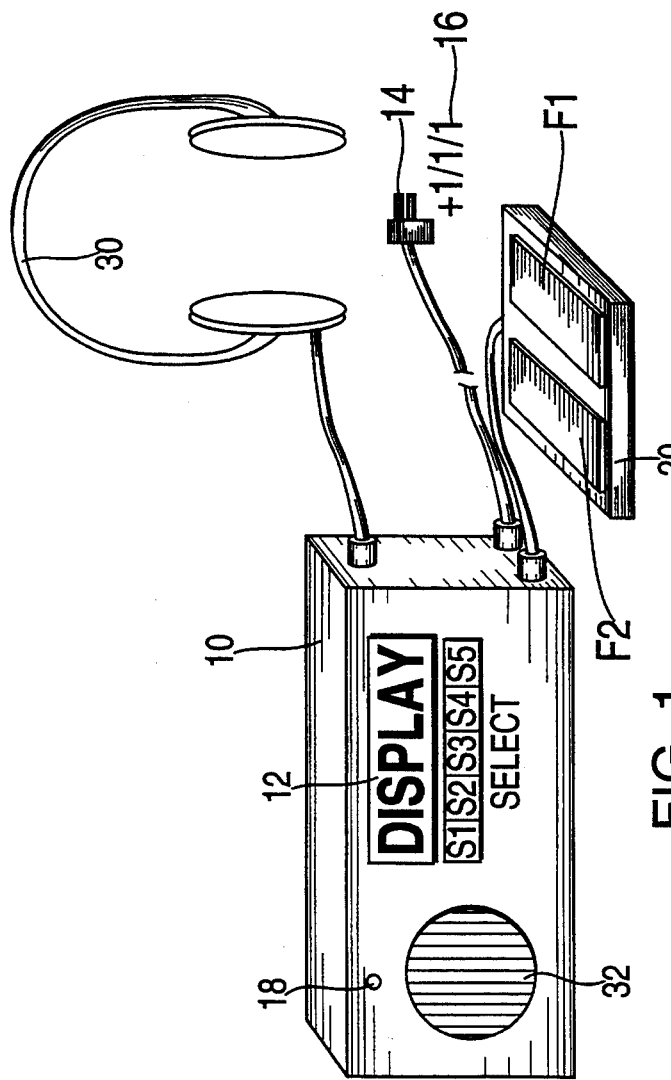
FIG. 1 illustrates the elements of the metronome equipment in accordance with the invention.

Referring to FIG. 1, a metronome in accordance with the invention has a metronome unit 10 which houses a microcontroller and associated electronic circuitry, and also has select switches S1, S2, S3, S4, and S5, and a display 12 for a visual aid. The metronome unit 10 is supplied with power through an external power line 14 or through batteries 16 for portability. An LED indicator 18 can be used to provide a visual indicator of the tempo to the user. A footswitch 20 is connected to the metronome unit and has two switches F1 and F2 operable by foot. The metronome unit 10 may have a connector for a pair of headphones 30 and an audio speaker 32 to provide an audible cue of the tempo to the user.

Figure 2:
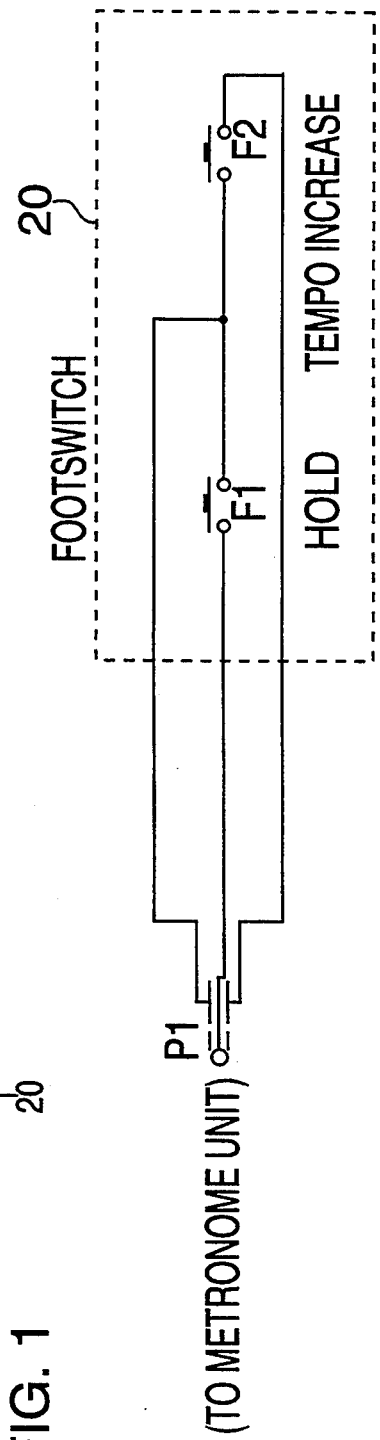
FIG. 2 is a schematic diagram of the footswitch input to the metronome unit.

In FIG. 2, the footswitch 20 is shown having switch F1 for holding and releasing a tempo level, and switch F2 for adjusting the tempo. An output jack P1 plugs into the metronome unit and inputs the signals from switches F1 and F2.

Figure 3:
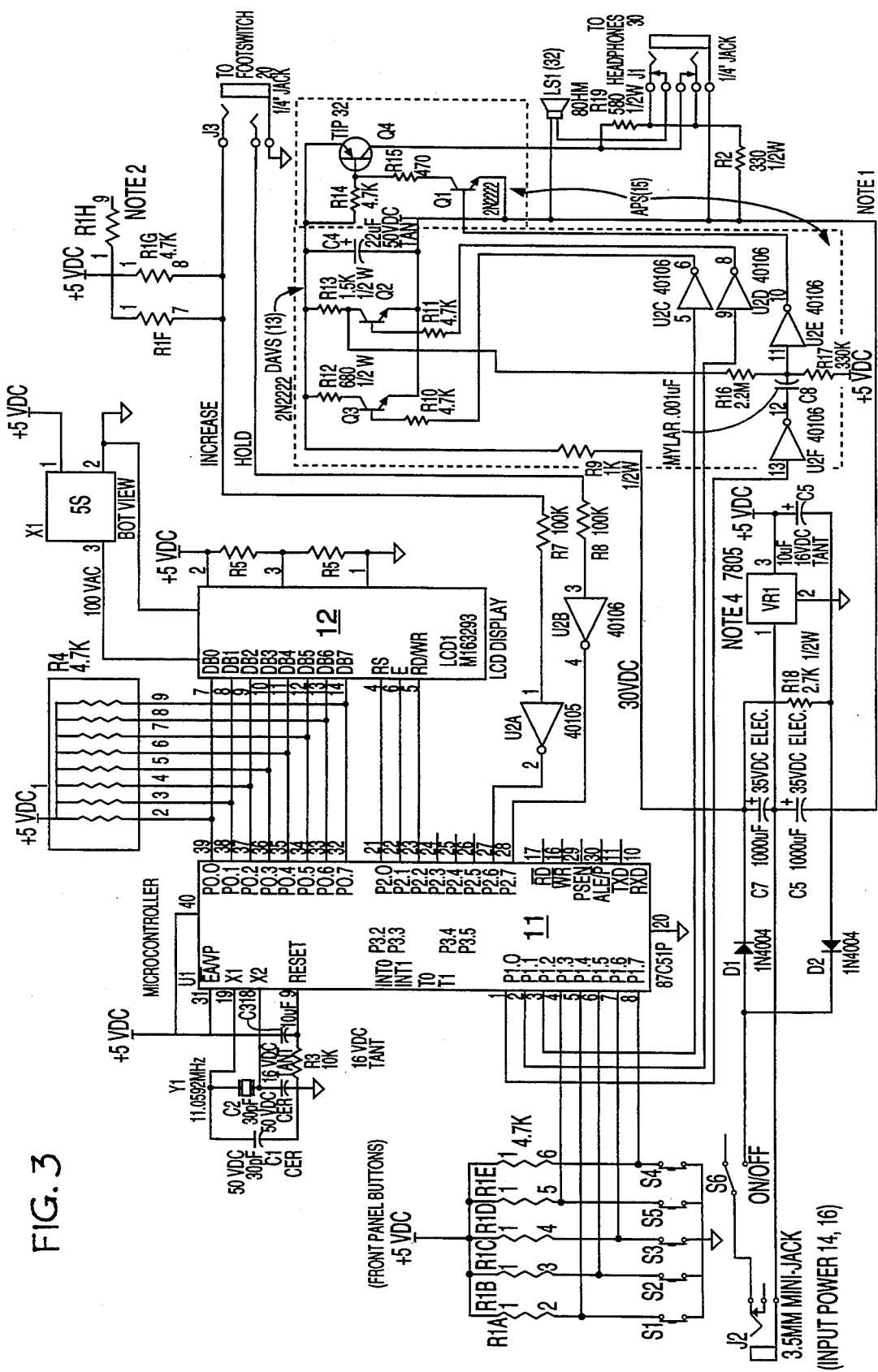
FIG. 3 is a circuit diagram of the microcontroller and electronic circuit of the metronome unit.

FIG. 3 is a circuit diagram showing the microcontroller 11 for the metronome unit, an LCD display 12, the input power from a power line 14 or batteries 16, select switches S1, S2, S3, S4, and S5, a digital adjustable voltage source (DAVS) 13 and acoustic pulse switch (APS) 15 for the audio output to the headphones 30 or loud speaker 32, and a connector to the foot switch 20.

For a power line source, input AC power is applied to a rectifier doubler circuit comprised of diodes D1 and D2 and capacitors C6 and C7. These components are arranged in a half wave voltage doubler configuration that develops two voltage levels required by the other circuits. The 15 volt output of this circuit is fed to a 5-volt regulator VR1 which provides the 5 volts used to power the logic and display circuitry. The 30 volts available at the positive terminal of capacitor C7 provides the power requirements for the audio "click" generator and the headphones 30 or loudspeaker 32.

The front panel of the metronome unit includes the display 12 and the select switches S1, S2, S3, S4, and S5. The display consists of an LCD screen having, for example, a two line by 16 character wide display area. The LCD may be a backlit device, but will require a source of high voltage to operate. An X1 inverter module is shown for converting the available 5 volts DC to the required 100 volts AC for backlighting the display. The display can show menu selections and the adjustment of the tempo and the beat in a rhythm pattern to the user. It can also provide instructions and status information to the user as the select buttons are pushed.

The switches S1 and S2 are used for menu selection backward and forward. The switch S3 is used for Start or Stop, and for setting the mode as Standard or Program. The S4 and S5 switches are used to increment up and down in tempo, increments, note values, etc. The standard note values may have five or more pre-programmed note divisions, such as half, quarter, eighth, triplet, and sixteenth note values. Pushing a select button causes a logic low or "0" to be input to the corresponding port pin of the microcontroller 11 where it is used in the metronome program.

The interface to the footswitch 20 consists of a connector J3 and a resistor pack R1. Depressing switch F1 or F2 of the footswitch 20 causes a logic "0" to be input to the corresponding port pin of the microcontroller 11. Switch F1 signals the microcontroller to "hold" a tempo if an automatic tempo incrementing was in effect, and switch F2 signals the microcontroller to initiate automatic tempo incrementing from a low of 30 clicks per minute to a high of 360 clicks per minute on ¼ note value. The incrementing is continuous over the entire range of click counts.

The digital adjustable voltage source (DAVS) 13 provides the audible click of the metronome to the headphones 30 or loudspeaker 32. DAVS 13 is comprised of resistors R9 to R13, capacitor C4, transistors Q2 and Q3, and inverters U2C and U2D. The inverters U2C and U2D provide impedance translation between the microcontroller output and the input terminals (bases) of the transistors Q2 and Q3. The transistors Q2 and Q3 are connected in common emitter configuration in parallel with the capacitor C4. The 30 volt power is applied through R9 to charge the capacitor C4. If neither Q2 or Q3 is turned on, the capacitor C4 will charge to the full 30 volts. This charge is then available for discharge through the loudspeaker 32, which produces the maximum amplitude acoustic click (the "accented" click). If transistor Q2 is turned on by the control logic, the resistor R13 will be switched in to shunt the capacitor C9 and form a voltage divider between resistors R9 and R13. The capacitor then charges to a lower voltage which produces smaller amplitude acoustic clicks. Transistor Q3 and resistor R12 operate in the same way as Q2 and R13 except that they produce an even lower voltage level. Thus, DAVS 13 provides an output of click amplitude at three levels, i.e., Loud, Medium, and Soft. These levels are used for accenting musical beats so that any time signature patterns with desired cues or accents can be generated, for example, 5/4 time with primary and secondary accents.

The acoustic pulse switch (APS) 15 consists of capacitor C8, resistors R14 to R17, inverters U2E and U2F, and transistors Q1 and Q4 (see arrows pointing to two sections). The control logic provides a square wave output at the metronomic rate selected by the user. Each rising edge is input to U2F which provides impedance transformation and inversion. The output of U2F is input to a differentiator formed by capacitor C8 and resistor R17. The output of the differentiator is fed to the input of U2E. The output of U2E drives the switch formed by Q1 and Q4 with a squared pulse. When the switch turns on, it discharges the accumulated charge of capacitor C4 through the transistor Q4 directly to the loudspeaker 32 for a duration related to the time constant of capacitor C8 and resistor R17. The charge time of C8 is dynamically modified via resistor R16 by the DAVS 13 so that the pulse width is dependent upon the voltage selected. This provides for the simultaneous adjustment of both volume and tonal characteristics so that the three click types sound to the user as separate and distinct sounds. A fourth sound type is derived in the control logic by the output of four cycles of 1600 hertz, which produces a chirping sound rather than a click. This fourth sound type can be accompanied by the LED flashing to reinforce its existence.

The control logic is pre-programmed to perform the functions of pulsing, sequencing, counting, dividing, sound type selection, foot switch interfacing, and front panel operation. The control logic consists of the microcontroller 11, clock pulse generator Y1, capacitors C1, C2, and C3, and resistor R3. The microcontroller 11 may be a single-chip programmable IC, such as that sold by Intel Corp. under the 87C51P designation. The clock pulse generator Y1 and capacitors C1 and C2 form a crystal oscillator clock for the microcontroller 11. All timing for the metronome is derived from this crystal time base. Capacitor C3 and resistor R3 provide a momentary reset pulse to the microcontroller 11 for initiating the control logic program and function.

In operation, the user can program in a desired beat pattern, tempo, increment value, and/or note value using the five switches S1 to S5. The microcontroller accesses the corresponding pre-programmed beat pattern starting with a low time duration of 30 clicks per minute on ¼ standard value or corresponding clicks for any other note values. The user can play an instrument and adjust the tempo upward by operating the footswitch F2 to automatically shorten the time duration of the note division up to a count of 360 clicks per minute. The resulting click pattern is provided audibly to the user through the headphones 30 or loudspeaker 32, and visually through the display 12. The user can hold the desired tempo by pressing the footswitch F1, and this action will be reflected by the word "HOLD" on the display. Pressing the footswitch F1 again allows incrementing of the tempo and clears the word "HOLD" from the display. The tempo can be reset to the low end of the range by stopping the metronome unit then starting, in order to generate a reset pulse to reset the microcontroller 11. Alternatively, the footswitch F2 can be a double pole switch to increment the tempo upward automatically by switching to one pole, and to decrement the tempo downward by switching to the other pole.

Although the invention has been described with reference to certain preferred embodiments, it will be appreciated that many other variations and modifications thereof may be devised in accordance with the principles disclosed herein. The invention, including the described embodiments and all variations and modifications thereof within the scope and spirit of the invention, is defined in the following claims.

I claim:

1. A metronome apparatus for generating a desired metronome click pattern having a beat pattern, tempo, increment value, and note value, said apparatus comprising:

a select switch means for setting the beat pattern, the tempo, the increment value, and the note value of the desired metronome click pattern;

a control means including a microcontroller, electronically coupled to said select switch means, for producing a click pattern signal responsive to said select switch means;

an output means, electronically coupled to said control means, for producing said click pattern signal as an audible click pattern comprising a series of audible clicks;

a footswitch means for incrementing and holding the incrementing of the tempo of the desired metronome click pattern, said footswitch means and said control means being electronically coupled, said control means further producing said click pattern signal responsive to said footwswitch means;

said control means including a click accenting means for producing said click pattern signal such that one or more of said series of audible clicks of said audible click pattern produced by said output means has an audible accent representative of the note value.

2. A metronome apparatus according to claim 1, wherein said select switch means includes a switch for providing a switch signal to an input of said microcontroller representing selection of one of a plurality of note values including at least half, quarter, eighth, triplet, and sixteenth note values.

3. A metronome apparatus according to claim 1, wherein said click accenting means of said metronome assembly includes a digital pulse voltage source and an acoustic pulse switch having inputs coupled to outputs of said microcontroller and outputs coupled to said output means of said metronome assembly, said digital pulse voltage source having means for producing a click amplitude at any of a plurality of different levels, and said acoustic pulse switch having means for producing different tones of distinct types.

4. A metronome apparatus according to claim 1, further comprising a pair of headphones connected to said output means of the metronome assembly.

5. A metronome apparatus according to claim 1, further comprising a loudspeaker connected to said output means of the metronome assembly.

6. A metronome apparatus according to claim 1, wherein said output means of the metronome apparatus includes a visual display coupled to an output of said microcontroller.

7. A metronome apparatus according to claim 1, wherein said control means further includes a digital pulse voltage source, an acoustic pulse switch, and a power source for providing power to said digital pulse voltage source, said digital pulse voltage source and acoustic pulse switch having inputs coupled to outputs of said microcontroller and outputs coupled to said output means of said metronome apparatus, said digital pulse voltage source having means for producing a click amplitude at any of a plurality of different levels, and said acoustic pulse switch having means for producing different tones of distinct types, wherein said digital pulse voltage source comprises a capacitor, first and second transistors having input terminals thereof coupled to respective outputs of said microcontroller and connected in common emitter configuration in parallel with said capacitor, and first and second resistors connected in series with respective emitters of said transistors, and is coupled to the power source such that the power source charges said capacitor fully if neither of said transistors is turned on by said microcontroller, thereby allowing the full capacitor charge to discharge to said output means and produces a maximum amplitude acoustic click, the power source charges said capacitor at a first partial level if said first transistor is turned on by said microcontroller, thereby allowing the first partial capacitor charge to discharge to said output means and produce an intermediate amplitude acoustic click, and the power source charges said capacitor at a second partial level if said second transistor is turned on by said microcontroller, thereby allowing the second partial capacitor charge to discharge to said output means and produce a low amplitude acoustic click.

8. A metronome apparatus according to claim 7, wherein said acoustic pulse switch comprises a first inverter having an input connected to an output of said microcontroller, an RC differentiator circuit connected in series to an output of said first inverter and also connected in common node configuration to said digital pulse voltage source, a second inverter having an input connected in series to an output of said RC differentiator, and first and second transistors connected in emitter-base configuration and having an input connected to an output of said second inverter and their output connected to said audio output, wherein said microcontroller includes a square wave signal generator for providing a square wave signal for the click pattern of the tempo to said acoustic pulse switch, said capacitor is charged to a level dynamically modified depending upon the capacitor voltage level selected in the digital pulse voltage source, and the charge level of said capacitor results in generation of a output pulse of corresponding pulse width by said first and second transistors to said output means, thereby providing for simultaneous adjustment of both volume and tonal characteristics for the maximum, intermediate, and low clicks as separate and distinct sounds.

9. A metronome apparatus according to claim 1, wherein said footswitch means includes a first switch and a second switch operable by foot for producing first and second footswitch signals, respectively, said microcontroller of said control means being responsive to said first footswitch signal for holding and releasing the incrementing of the tempo for the metronome click pattern and being responsive to said second footswitch signal for incrementing the tempo.

10. A metronome apparatus according to claim 1, wherein said footswitch means includes a double pole switch which is switched by foot to one pole for providing an increase switch signal to said control means of said microcontroller for controlling said microcontroller so as to increment the tempo upward automatically, and switched by foot to the other pole for providing a decrease switch signal to said control means to decrement the tempo downward.

* * * * *